June 16, 1936.    G. T. K. WOODLEY    2,044,271
DRAFT EQUALIZER
Filed April 18, 1935
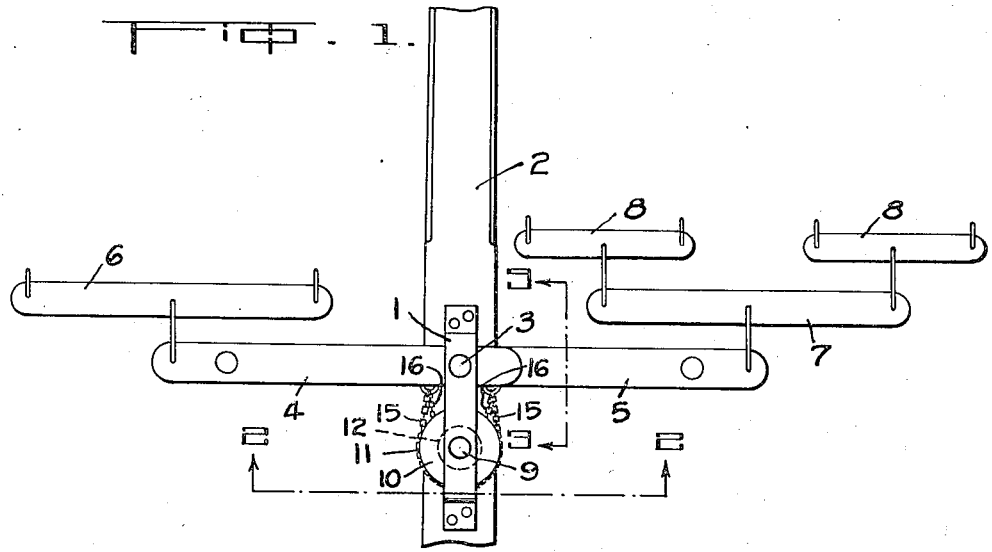
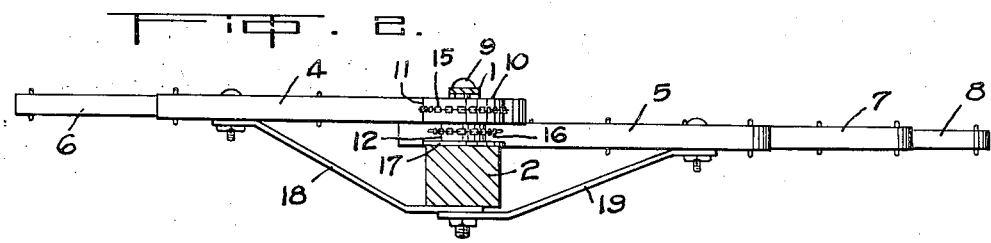
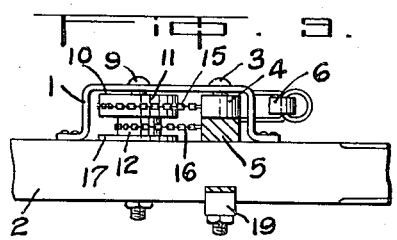
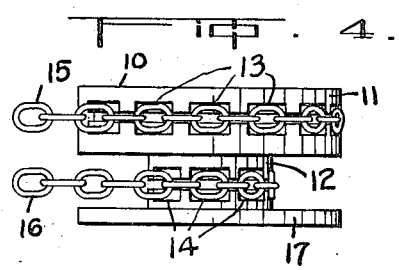
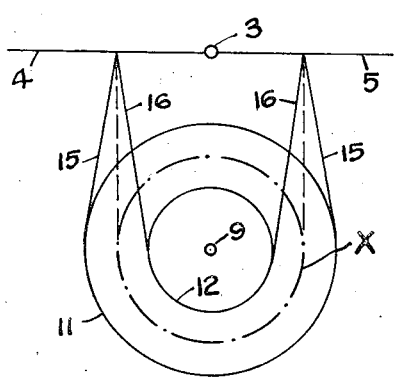
Inventor
G.T.K.WOODLEY
By J.E.M. Fetherstonhaugh
Attorney Patented June 16, 1936

2,044,271

UNITED STATES PATENT OFFICE 2,044,271

DRAFT EQUALIZER

Gordon Terrence Kenzie Woodley, Waterford, Ontario, Canada

Application April 18, 1935, Serial No. 17,030

2 Claims. (Cl. 278—14)

My invention relates to improvements in draft equalizers for use particularly in the drafts of horse drawn agricultural implements where one horse is hitched on one side of the tongue and two or more horses are hitched on the other side of the tongue, and the object of the invention is to provide means for equalizing the draft and minimizing the side draft.

A further object is to devise means for the above purpose which will be simple, compact, strong and which will function positively at all times.

With the above and other objects in view which will hereinafter appear as the description proceeds, my invention consists of the construction and arrangement hereinafter more particularly described and illustrated in the accompanying drawing in which:—

Fig. 1 represents a plan view of a tongue and draft hitch for three horses showing my device applied thereto.

Fig. 2 is a section thereof taken on the line 2—2 (Fig. 1).

Fig. 3 is a section taken on the line 3—3 (Fig. 1).

Fig. 4 is an enlarged detail in elevation of the double drum for achieving the equalizing effect, and Fig. 5 is a diagrammatic view illustrating the manner in which my device is connected into the draft hitch.

Like characters of reference indicate corresponding parts in the different views.

According to my invention, I provide a bracket 1 longitudinally disposed on the tongue 2 of the implement, said bracket having a pin 3 therethrough which serves as a fulcrum for the opposed levers 4 and 5 which are pivotally connected intermediately of their length to the bracket by means of the pin 3, said levers being of the same length. The lever 4 has the swingle tree 6 connected to its outer end in orthodox fashion and the lever 5 carries the double tree 7 which is in turn provided with swingle trees 8. A second pin 9 extends vertically through the bracket 1 in spaced relation to the pin 3 on the longitudinal axis of the tongue 2 and a double equalizing drum 10 is rotatably mounted on such pin between the bracket and the tongue.

The drum 10 which is of the chain driven type has two peripheral surfaces 11 and 12, the surface 11 being of greater radius than the surface 12 and the surfaces containing respectively a series of interrupted chain link receiving recesses 13 and 14. In the case of a three horse hitch as illustrated, the radius of the surface 11 is double that of the surface 12.

Chains 15 and 16 extend respectively about the larger and smaller peripheries 11 and 12 of the drum being received respectively into the series of recesses 13 and 14. The free ends of the chain 15 are connected to the lever 4 at points distant from its fulcrum equal to the mean radius of the two drum peripheries 11 and 12, and the free ends of the chain 16 are connected to the lever 5 at points also distant from its fulcrum equal to the mean radius of the two drum peripheries, it being understood that the axes of the pins 3 and 9 are on the longitudinal centre line of the tongue 2. Such connections are clearly illustrated in Fig. 5 of the drawing in which X indicates the mean radius of the surfaces 11 and 12.

The lower portion of the drum 10 is provided with a flange 17 seating said drum on the tongue 2 and preventing strain being put on the pin 9.

Braces 18 and 19 extend from the pin 3, which extends through the tongue, to the respective levers 4 and 5 being secured thereto and swinging therewith.

The device functions as follows:—

The single horse through the medium of the lever 4 and chain 15 wound about the major surface 11 of the drum 10 exerts a pull which is balanced by that of the two horses pulling on the minor drum surface through the medium of the lever 5 and chain 16. Thus the maximum displacement of the draft of any of the horses out of the longitudinal axis of the tongue is only the distance of the connection of the chains from the fulcrum of the levers, or in other words the mean radius of the drum surfaces. Consequently a substantially ideal equalized draft is obtained and one that remains constant irrespective of the relative positions of the horses without any appreciable side draft.

Where it is desired to employ four or more horses instead of three, one hitched on one side of the tongue and the remainder on the other side, it is only necessary to change the ratio of the radius of the major surface of the drum to that of the minor surface.

What I claim as my invention is:

1. In a draft equalizer for employment on vehicles to which unequal numbers of horses are hitched on opposite sides of a laterally swingable tongue, the combination with a tongue, of a drum rotatable thereon and having two peripheries of different radii, opposed laterally extending levers pivoted on the tongue on a common fulcrum, means for hitching the horses to the ends of the levers, flexible means operatively connected to and wound about the larger periphery of the drum and attached to one of said levers at a distance from its fulcrum equal to the mean of the radii of the drum peripheries for hitching the lesser number of horses, and flexible means operatively connected to and wound on the smaller periphery of the drum and attached to the other of said levers at a distance from its fulcrum equal to the mean of the radii of the drum peripheries for hitching the greater number of horses, the ratio of the radii of the drums being equal to the ratio of the number of horses hitched to the respective drum peripheries.

2. In a draft equalizer for employment on vehicles to which unequal numbers of horses are hitched on opposite sides of a laterally swingable tongue, the combination with the tongue, of a bracket secured thereon, a pin extending through the bracket and tongue, opposed laterally extending levers swingably mounted on the pin for movement in a horizontal plane, an unequal number of horses being hitched to the respective levers, a drum having two peripheries of different radii and rotatably mounted between the bracket and the tongue, the ratio of the two peripheries being equal to the ratio of the number of horses on the respective sides of the tongue, a flexible member wound around the larger periphery of the drum and having its ends connected to the lever to which the lesser number of horses is hitched on each side of the fulcrum thereof, a second flexible member wound around the smaller periphery of the drum and having its ends connected to the lever to which the greater number of horses is hitched on each side of the fulcrum thereof, the axis of the common fulcrum of the levers and the axis of the drum being disposed perpendicularly to the longitudinal axis of the tongue and in a vertical plane passing therethrough and the flexible members being attached to the levers at a distance from their common fulcrum equal to the mean of the radii of the drum peripheries, and means on each periphery of the drum for operatively connecting such periphery to its flexible member.

GORDON TERRENCE KENZIE WOODLEY.